United States Patent
Koeder et al.

(10) Patent No.: US 8,714,064 B2
(45) Date of Patent: May 6, 2014

(54) MACHINE TOOL, PARTICULARLY A HAND-HELD POWER TOOL

(75) Inventors: Thilo Koeder, Gerlingen (DE); Joachim Platzer, Remseck-Hochberg (DE); Ulli Hoffmann, Niefern-Oeschelbronn (DE)

(73) Assignee: Robert Bosch GmbH, Stuttgart, DE (US)

( * ) Notice: Subject to any disclaimer, the term of this patent is extended or adjusted under 35 U.S.C. 154(b) by 337 days.

(21) Appl. No.: 13/141,685

(22) PCT Filed: Nov. 20, 2009

(86) PCT No.: PCT/EP2009/065567
§ 371 (c)(1),
(2), (4) Date: Sep. 12, 2011

(87) PCT Pub. No.: WO2010/072485
PCT Pub. Date: Jul. 1, 2010

(65) Prior Publication Data
US 2011/0308369 A1 Dec. 22, 2011

(30) Foreign Application Priority Data

Dec. 22, 2008 (DE) .......................... 10 2008 055 059

(51) Int. Cl.
*B23Q 15/00* (2006.01)
*B26D 7/00* (2006.01)
*B25F 3/00* (2006.01)
*B27B 19/14* (2006.01)

(52) U.S. Cl.
USPC ........... 83/75; 83/521; 83/72; 30/123; 30/374

(58) Field of Classification Search
USPC ................ 359/721, 811, 672–675, 372, 373;
83/72–75, 76.6, 76.7, 358, 365, 368,
83/776, 520, 521; 30/166.3, 392, 393,
30/394, 514, 525, 123, 374
See application file for complete search history.

(56) References Cited

U.S. PATENT DOCUMENTS

| 3,504,716 A | 4/1970 | Bush et al. |
| 4,549,453 A * | 10/1985 | Yazaki et al. ................... 83/365 |
| 5,010,652 A | 4/1991 | Miletich |
| 7,131,206 B2 * | 11/2006 | Wu ................................ 30/392 |
| 7,221,399 B2 * | 5/2007 | Fujita et al. .................... 348/340 |
| 2003/0202091 A1 | 10/2003 | Garcia et al. |
| 2005/0237634 A1 * | 10/2005 | Rothmann ..................... 359/811 |
| 2008/0229589 A1 * | 9/2008 | Bone .............................. 30/392 |
| 2008/0252726 A1 * | 10/2008 | Chan et al. ..................... 348/143 |
| 2008/0302226 A1 * | 12/2008 | Fischer .......................... 83/520 |

FOREIGN PATENT DOCUMENTS

| DE | 10 2006 052 808 | 5/2008 |
| WO | 2007/031993 | 3/2007 |

OTHER PUBLICATIONS

International Search Report corresponding to PCT Application No. PCT/EP2009/065567, mailed Jul. 7, 2010 (German and English language document) (7 pages).

* cited by examiner

*Primary Examiner* — Sean Michalski
*Assistant Examiner* — Jonathan G Riley
(74) *Attorney, Agent, or Firm* — Maginot, Moore & Beck

(57) ABSTRACT

A power tool, particularly a hand-held power tool, is provided with a sensor unit for sensing an observation area on the workpiece side with varying resolution and having arranged in front of it a lens system with lenses of varying focal length.

11 Claims, 2 Drawing Sheets

MACHINE TOOL, PARTICULARLY A HAND-HELD POWER TOOL

This application is a 35 U.S.C. §371 National Stage Application of PCT/EP2009/065567, filed Nov. 20, 2009, which claims the benefit of priority to Application Serial No. DE 10 2008 055 059.0, filed Dec. 22, 2008 in Germany, the disclosures of which are incorporated herein by reference in their entirety.

The disclosure relates to a machine tool, particularly an electrically driven hand-held power tool.

BACKGROUND

Machine tools, particularly electrically driven hand-held power tools, are principally known in the design of compass saws having a saw blade, driven to reciprocate, as working tool in various configurations and stages of development, including with regard to auxiliary devices that are intended to facilitate working with the machine tool for the user, particularly guiding it along a prescribed working line.

Thus, there are known from practice hand-guided machine tools, inter alia in the form of compass saws, circular saws, hand-held planes or routing machines having mechanical guiding devices, in the case of which the guiding is performed along a reference edge by means of a guide shoe that is connected to the machine via a cantilever transverse to the working direction.

Also known are machine tools, particularly in the form of electrically operated hand-guided compass saws, for example from DE 10 2006 052 808 A1, in the case of which a workpiece side working line that is respectively to be followed is intended to be followed via a sensor unit, particularly an optical sensor unit in the form of a camera, and in the case of which the user of the machine tool is supported in guiding it along the working line via an evaluation unit on the basis of the workpiece side conditions thus detected. This is so, for example, because the position of the working tool in relation to the working line is displayed to the user, if appropriate with supplementary guide instructions. If the machine is equipped as a compass saw with a saw blade, as working tool, that can rotate about its stroke axis, in the case of such a known solution the working line of the saw blade, which is detected by sensor, is followed by appropriate setting of its rotary position, for which purpose the data detected by sensor are converted with computational aid via an evaluation unit into actuating commands for an actuator rotating the saw blade. All that the user need do in this semiautomatic mode is to apply the feed forces for the compass saw, and thus to support the compass saw in a fashion coarsely aligned with the respective working line.

Irrespective of whether only guide instructions are generated for the user on the basis of the data detected by sensor, or whether the compass saw is operated semiautomatically, in view of the relatively high feed rates with compass saws, the user requires information at an early stage so that—in the event of deviations from the desired working line, of the lack of such instructions or of the semiautomatic guidance, for example because of difficulties in detecting a working line, or the absence of a working line—he can intervene in good time if the machine is not switched off automatically.

SUMMARY

It is the object of the disclosure to provide preconditions for early and, if appropriate, also for improved guide information.

In accordance with the disclosure, this is achieved by configuring the machine tool in accordance with the features set forth herein, in accordance with which a plurality of observation fields, particularly a detection surface and at least one probing surface are detected, particularly with different resolution, via the observation device. At least one probing surface is in the direction of the working line upstream of the detection surface. The probing surface is preferably detected with a coarser resolution by comparison with the detection surface. This renders it possible, on the one hand, to provide for the detection surface a degree of resolution that enables an accurate detection of the working line in the access region of the working tool, and thus, particularly, of the saw blade, and this is advantageous for the quality of the saw cut. Moreover, the additional detection of a probing surface upstream of the detection surface produces, in advance of the detection of the working line in the detection surface, instructions relating to the course of the working line as well as to possible irregularities in the structure of the workpiece and to difficulties in legibility of the working line, which can be used to guide the saw blade in a fashion complementary to the conditions detected in the detection surface, be this in relation to the alignment of the tool, particularly the saw blade, in relation to adapting the drive power for the saw blade, or in relation to adjusting the working speed thereof, that is to say the number of strokes. Furthermore, this is also because owing to the detection of the working line already performed in the probing surface there are data available which can be used to protect and/or supplement the data obtained in the detection surface. In particular, the relatively coarse detection of the workpiece side conditions, and thus of the working line, already facilitates the possibility of making information available to the user so early that the latter can, in case of need, still intervene in good time and thus, by way of example, can go over from the semiautomatic mode to manual guidance of the compass saw, and can also switch off the latter if appropriate before damage occurs to the workpiece.

A refinement that is particularly expedient according to the disclosure consists in detecting a number of observation fields, and thus also the detection surface and the at least one probing surface, with the aid of only one sensor, particularly a camera, via an upstream optical system, particularly a lens system.

The probing surface is expediently, in particular, also expanded in width by comparison with the detection surface, thus yielding additional options for accident prevention such as, for example, the detection of living material, in particular of body parts.

In principle, it is within the scope of the disclosure to achieve a different resolution for the detection surface and the probing surface with the aid of a respectively assigned sensor unit, and this can be associated with difficulties as regards the existing space relationships, but in particular, however, means an increased outlay.

Consequently, a particularly expedient solution within the scope of the disclosure consists in providing as observation device only a sensor unit, particularly formed by a camera, and a lens system that is upstream thereof and which is preferably designed with lenses of different focal lengths with regard to the differing resolution desired for the detection surface and the probing surface.

In practice, consideration is given in this regard particularly to a lens design that, in a fashion corresponding to the design of a progressive lens in a pair of spectacles, provides for the near range, that is to say for the detection surface, a lens, aligned therewith, of shorter focal length than for the lens aligned with the probing surface. In a corresponding way, line sensors can have two or more line regions of different refraction.

In a fashion corresponding to the viewing areas in the case of progressive spectacles, the detection surface and the probing surface can also merge into one another spatially within the scope of the disclosure. However, such a smooth transition is not mandatory for the disclosure, and so it can even be expedient for the positions of the detection surface and the probing surface to be separated, particularly when the probing surface is ahead in the direction of the working line, in order to limit the size of the probing surface to the extent that it is still possible to achieve a satisfactorily good resolution.

Particularly in the case of semiautomatically operated machine tools, particularly compass saws, an inventive observation device is particularly advantageous, since when the user is attuned to the semiautomatic mode his degree of attentiveness correspondingly diminishes, at least over the duration, so that an early "advanced warning" is important. On the other hand, as a rule only a relatively small detection surface corresponding to the processing range of the tool is available. Such a small detection surface is, however, advantageous in order, given a minimum spacing to be observed as dictated by the job, to achieve a targeted high resolution in conjunction with a lower quality of the sensor unit used, even when said spacing is small.

BRIEF DESCRIPTION OF THE DRAWINGS

Further advantages and expedient designs may be gathered from the further claims, the description of the figures and the drawings. In the drawings:

DETAILED DESCRIPTION

Figure 1:
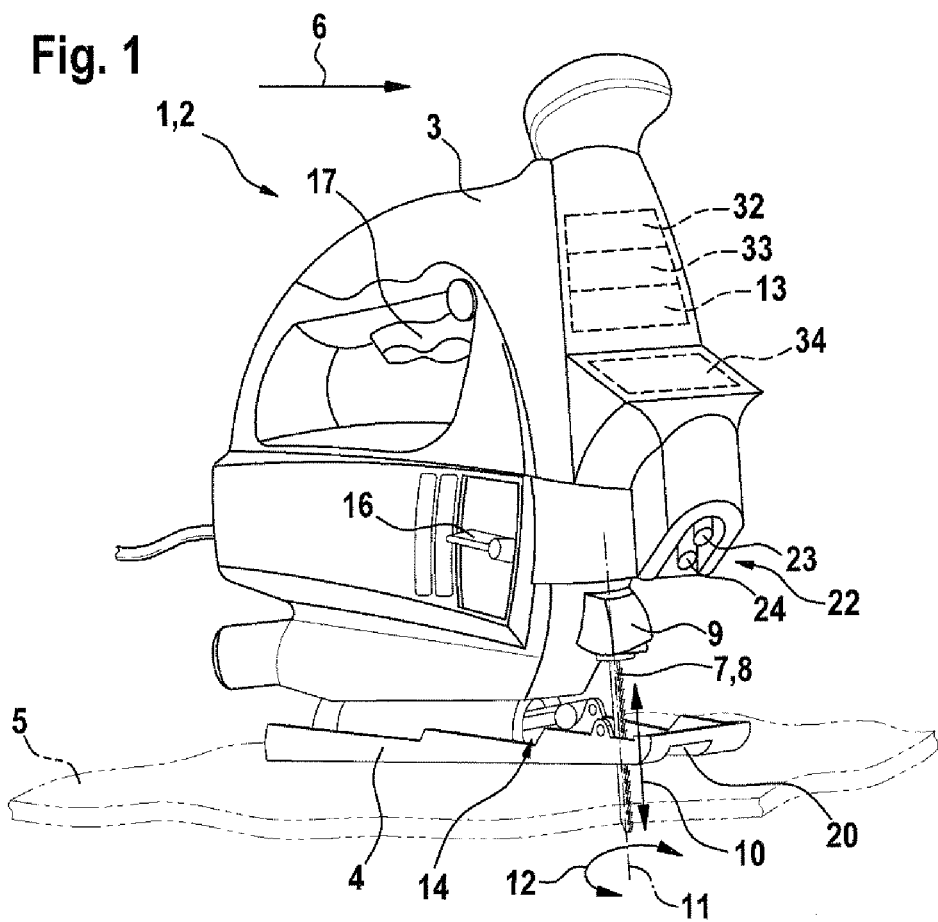
FIG. 1 shows a perspective illustration of a compass saw that is to be operated semiautomatically and has a saw blade that can be rotated about its stroke axis, and whose rotary position can be set via an actuator—in a fashion controlled as a function of workpiece side conditions detected via a sensor unit—, the compass saw being illustrated mounted on a workpiece.

FIG. 1 shows a machine tool 1 fashioned as a compass saw 2. Its housing 3 is supported displaceably on a workpiece 5 via a foot plate 4. In the region of the compass saw 2 at the front in the working direction 6, said saw has a saw blade 8 as working tool 7. The saw blade 8 is held in a tool holder 9 and driven to reciprocate in the direction of the arrow 10. As indicated by the arrow 12, the saw blade 8 can be rotated via an actuator 13 (illustrated only symbolically) about a rotational axis 11 extending in the direction of the stroke axis. Furthermore, to the rear of the saw blade 8 there lies a drive device 14 via which the saw blade 8 can swivel about a swivel axis (not illustrated) running transverse to the rotational axis.

The compass saw 2 is to be operated in various operating modes. One of these is the regular operating mode with the saw blade 8 aligned in the working direction 6 for the purpose of carrying out saw cuts while maintaining the alignment of the saw blade 8 in the direction of the longitudinal axis of the compass saw 2. A further operating mode is the so called oscillating reciprocating-movement mode, in which the saw blade 8 is movable in an oscillating fashion in superposition to the reciprocating movement in accordance with the arrow 10 by means of the drive device 14 about the swivel axis (not shown) running transverse to the rotational axis 11.

Figure 2:
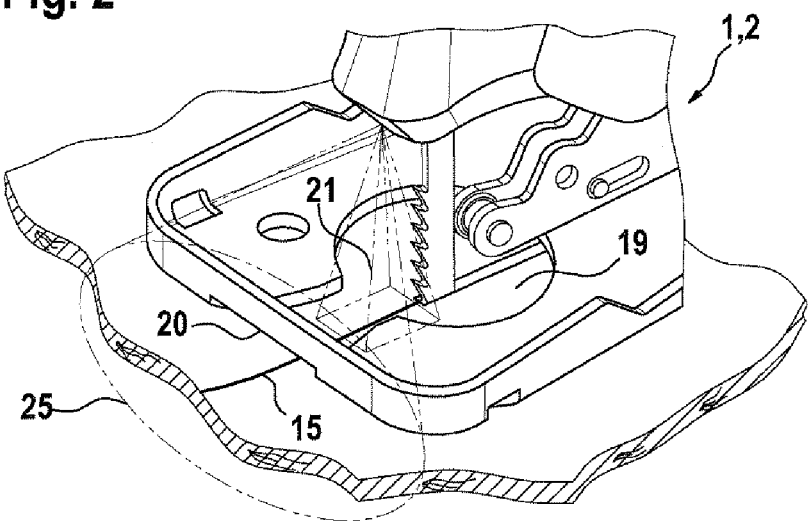
FIG. 2 shows a perspective plan view of the front side foot area of the compass saw in accordance with FIG. 1, with a detection surface that is partially limited by the section of the foot plate penetrated by the saw blade, and upstream of which there is a probing surface.

In a third operating mode, use is made of the rotatability of the saw blade 8 about its rotational axis 11, and the compass saw is to be used as a so called scrolling jigsaw. Assuming appropriate driving of the saw blade 8 via the actuator 13, the compass saw 2 can thus be operated as a semiautomatic compass saw 2, if appropriate in superposition to the one or other of the two other operating modes. This means that the user holding the compass saw 2 essentially only takes over the support coarsely aligned with the working direction and the corresponding feed, whereas the exact positioning, aligned, as indicated in FIG. 2, with a working line 15 and corresponding thereto, of the compass saw 2 is performed by the rotatable adjustment of the saw blade 8, which follows the working line 15.

The individual operating modes are to be set via a switching device 16. Also indicated is a switching arrangement 17 for switching the compass saw on and off.

The actuator 13 is driven via an electronic unit 32 and an arithmetic logic unit 33 on the basis of the data detected, it being additionally expedient for operational data, thus guide instructions for the compass saw 2, in particular, to be displayed in a display 34.

Provided in the foot plate 4 in a fashion surrounding the saw blade 8 is a recess 19 that bounds the working field of the saw blade 8 and which is widened forward in the working direction 6 by a cutout 20. Parts of the recess 19 and of the cutout 20 are used as detection surface 21 with which there is aligned the observation device 22 that is indicated in FIG. 1 and includes a sensor unit 23, particularly in the form of a camera. If appropriate, there is also provided in the region of the observation device an illumination arrangement 24 that is aligned with the working area.

Figure 3:
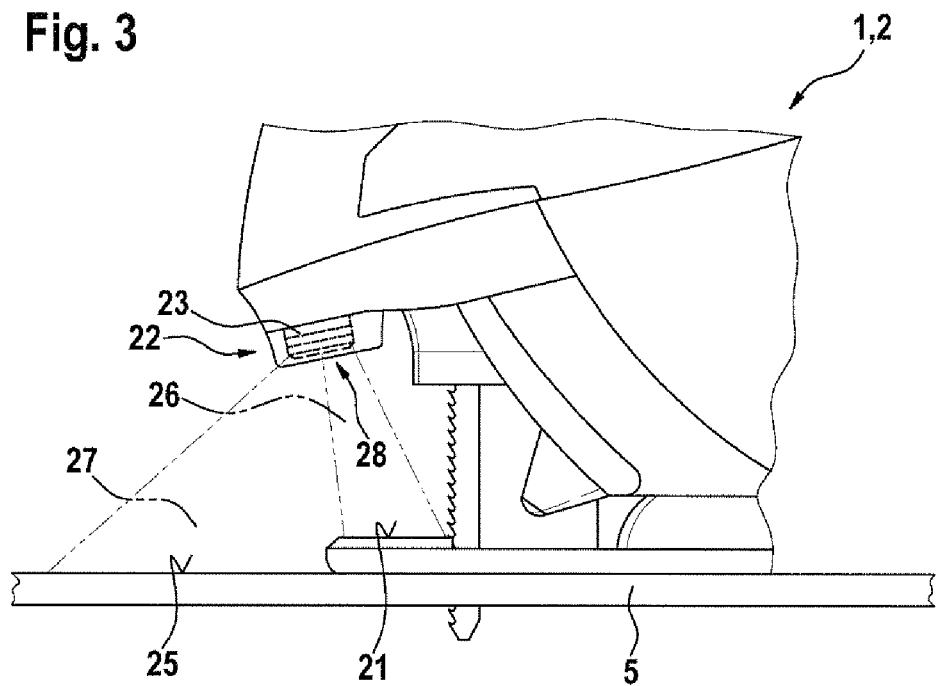
FIG. 3 is a schematic side view of the front area, shown partially in FIG. 2, with an additional illustration of the observation device, which includes a sensor unit.

FIGS. 2 and 3 show schematically that the sensor unit 23 of the observation device 22 is aligned with the detection surface 21 and, additionally, with a probing surface 25 upstream thereof as observation fields. The surface thereof is substantially larger than that of the detection surface 21 and, in particular, it also has a large width than the detection surface 21. It is also possible to split up into more than two fields within the scope of the disclosure.

FIG. 3 shows as a supplement to FIG. 2 the beam path 26 from the sensor unit 23 to the detection surface 21, and the beam path 27 from the sensor unit 23 to the probing surface 25. The probing surface 25 is separated from the detection surface 21 in the illustration in accordance with FIG. 2, but the two surfaces can also merge into one another.

Figure 4:
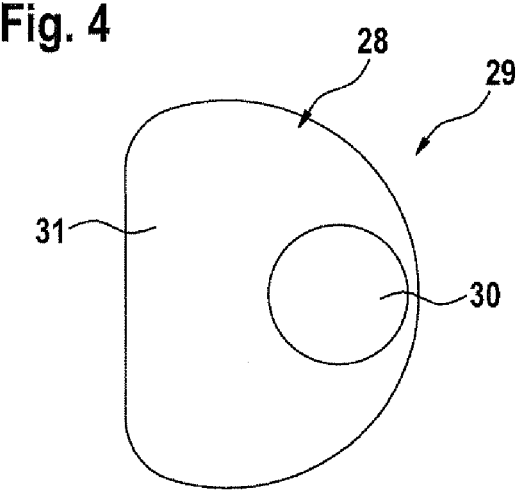
FIG. 4 is a schematic plan view of the lens arrangement, fashioned in the manner of a progressive lens of a pair of spectacles and provided on the output side in relation to the sensor unit.

Provided on the exit side in relation to the sensor unit 23 is a lens system 28, the principle of which is illustrated in a schematic and enlarged plan view in FIG. 4. In the form shown, the lens system 28 is of flat configuration, covers the sensor unit 23 on the output side and is configured with areas of different focal length in the manner of the progressive lens 29 of a pair of progressive spectacles. These areas are formed respectively by a lens 30 or 31, starting from the lens 30 the detection surface 21 being struck in accordance with the beam path 26, and starting from the lens 31 the probing surface 25 being struck in accordance with the beam path 27. The lens 30 aligned with the closer detection surface 21 has a shorter focal length than the lens 31 directed toward the probing surface 25. It is possible in a corresponding way for the lens system 28 also to have more than two lenses.

In a departure from the illustration in accordance with FIG. 4, which serves essentially only to explain, the subsurfaces formed by the lenses 30 and 31 preferably merge smoothly into one another. Of course, it is within the scope of the disclosure to provide additional observation surfaces and/or also to assign individual ones of the observation surfaces a separate sensor unit in each case. The solution illustrated and described above constitutes a preferred solution, however, since the detection surface 21 covers as desired only a small area of approximately 2×2 cm around the saw blade 8 in the case of a compass saw 2, and since as large as possible a number of measurement points are required to achieve a high precision, for which reason the active surface of the sensor unit, which latter in particular operates as a line sensor and is set up as a camera, must be focused onto a small area, specifically the detection surface 21, which is small by comparison with the probing surface 25. The detection accuracy decreases with increasing area, but this has no adverse effect in the region of the probing surface 25, since the detection of the narrow and, as the case may be, also not sharply delimited working line 15 is not a primary concern here—the aim should rather be, in particular, to detect problem fields such as knot holes or the like.

In accordance with the different resolution required for the detection surface 21 and the probing surface 25, which is to be achieved via the lens system 28, it is possible in the case of the inventive solution to work with conventional digital and analog cameras since, in the case of the focusing achieved by the lens 30, the lines and pixel numbers are also sufficient for the required high resolution in the detection surface 21.

The disclosure therefore enables detection of different areas by making use overall of only one observation device 22 comprising a sensor unit 23 and a downstream lens system 28, thus rendering it possible to give feedback to the user regarding the work situation at an early stage without substantial additional outlay.

The invention claimed is:

1. A compass saw comprising:
    a saw blade driven to reciprocate; and
    an observation device including (i) a sensor unit having only one sensor that is aligned with a workpiece side observation area and a working line to be followed, (ii) at least one detection surface covering a working area of the working tool, (iii) an optical system that is upstream of the sensor unit and includes a lens system having lenses of different focal lengths,
    wherein the observation device has the sensor unit aligned with a plurality of observation fields including at least the detection surface and a probing surface,
    wherein the lens system includes a first lens having a first beam path aligned at the detection surface and a second lens having a second beam path aligned at the probing surface and
    wherein the probing surface is upstream of the detection surface in a direction of the working line.

2. The machine tool as claimed in claim 1, wherein the probing surface is expanded in width in relation to the detecting surface.

3. The machine tool as claimed in claim 1, wherein the sensor unit with an upstream lens system operates with a different optical resolution for different observation fields.

4. The machine tool as claimed in claim 1, wherein the lens aligned with the detection surface has a smaller focal length than the lens aligned with the probing surface.

5. The machine tool as claimed in claim 1, wherein the detection surface and the probing surface of the observation area merge into one another.

6. The machine tool as claimed in claim 1, wherein the detection surface and the probing surface of the observation area are arranged at a spacing from one another.

7. The machine tool as claimed in claim 1, wherein arranged downstream of the observation device is at least one evaluation unit, in particular an electronic unit and an arithmetic logic unit for circumstances detected in the region of the detection surface and/or of the probing surface.

8. The machine tool as claimed in claim 7, further comprising a display for user instructions placed downstream of the evaluation unit.

9. The machine tool as claimed in claim 7, wherein the saw blade is aligned with the working line via an actuator, and wherein the actuator is driven via a control unit arranged downstream of the evaluation unit.

10. The machine tool as claimed in claim 1, wherein there is provided in the region of the observation device an illumination device that is aligned with the working area.

11. The machine tool as claimed in claim 1, wherein the only one sensor includes a camera.

\* \* \* \* \*